United States Patent [19]
Hishinuma

[11] Patent Number: 4,963,739
[45] Date of Patent: Oct. 16, 1990

[54] RADIATION IMAGE READ-OUT APPARATUS

[75] Inventor: Kazuhiro Hishinuma, Kanagawa, Japan

[73] Assignee: Fuji Photo Film Co., Ltd., Kanagawa, Japan

[21] Appl. No.: 330,859

[22] Filed: Mar. 31, 1989

[30] Foreign Application Priority Data

Mar. 31, 1988 [JP] Japan .................................. 63-80068
Jul. 28, 1988 [JP] Japan ............................... 63-188980

[51] Int. Cl.$^5$ ............................................ G01N 23/04
[52] U.S. Cl. ............................... 250/327.2; 250/484.1
[58] Field of Search ................. 250/327.2 G, 327.2 D, 250/484.1 B; 364/413.13; 382/56, 57, 47

[56] References Cited

U.S. PATENT DOCUMENTS 4,652,999  3/1987  Higashi et al. .................... 250/327.2
4,878,250 10/1989  Kotera et al. ........................... 382/47

Primary Examiner—Janice A. Howell
Assistant Examiner—Richard Hanig
Attorney, Agent, or Firm—Sughrue, Mion, Zinn, Macpeak & Seas

[57] ABSTRACT

A radiation image read-out apparatus comprises a preliminary read-out device, a final read-out device, an image processor, and a condition adjuster. The condition adjuster is constituted of first and second operating sections for calculating, from a preliminary read-out image signal, a first read-out condition and/or a first image processing condition, and a second read-out condition and/or a second image processing condition. Both the first and second conditions are displayed for evaluation of the reliability thereof. A change-over section selects a mode wherein the first read-out condition is fed into the final read-out device and/or the first image processing condition is fed into the image processor, and a mode wherein the second read-out condition is fed into the final read-out device and/or the second image processing condition is fed into the image processor.

5 Claims, 7 Drawing Sheets

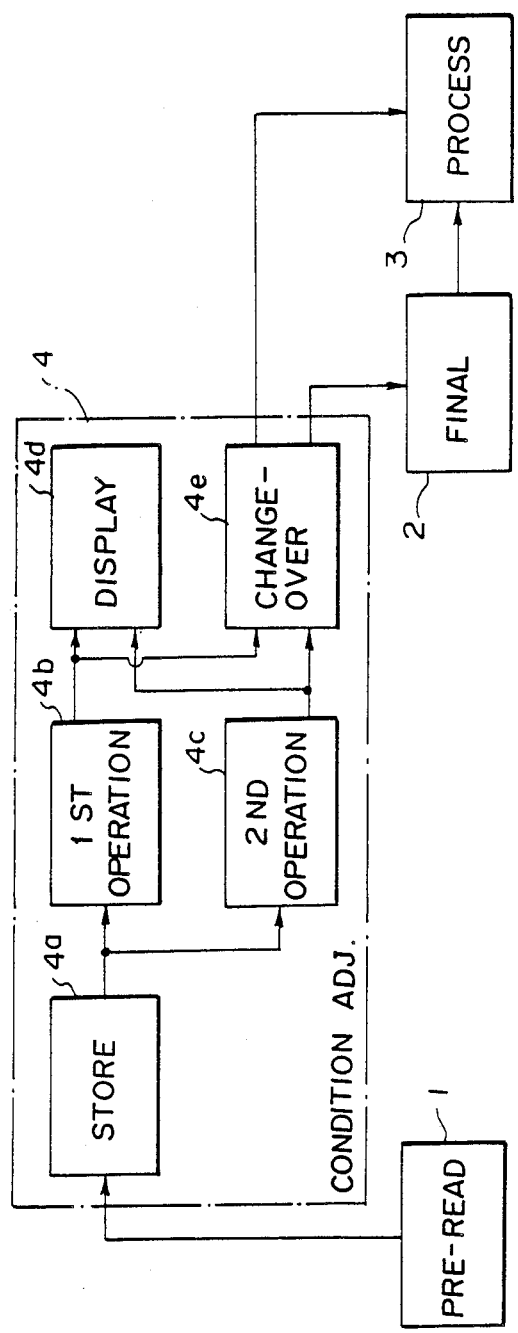
F I G. 1A

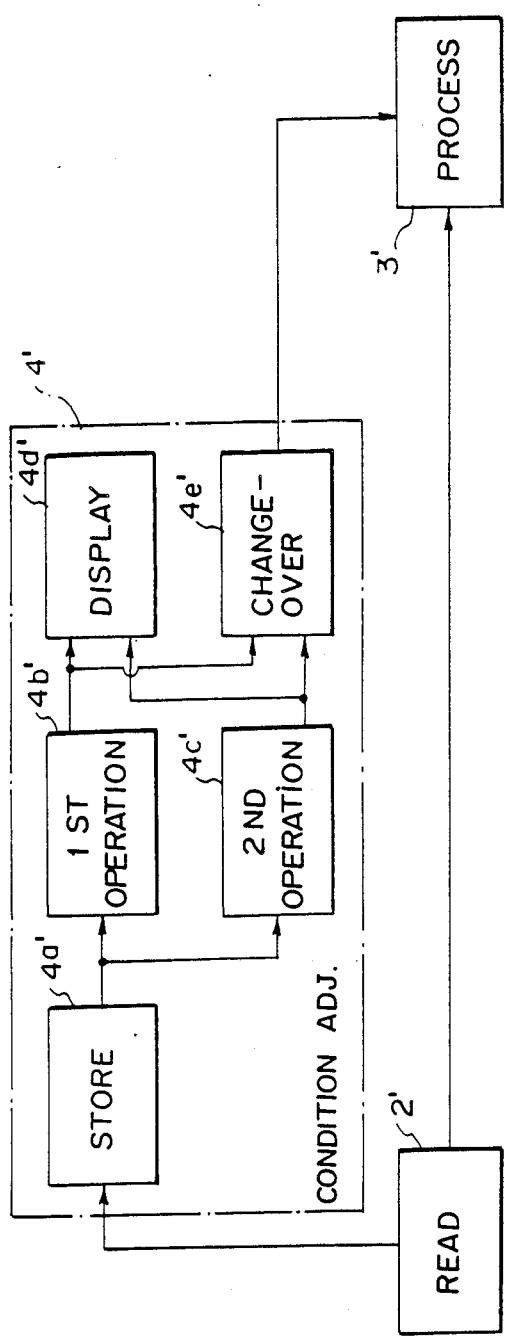

RADIATION IMAGE READ-OUT APPARATUS

BACKGROUND OF THE INVENTION

Field of the Invention

This invention relates to a radiation image read-out apparatus which obtains an image signal by reading out a radiation image of an object from a recording medium, such as a stimulable phosphor sheet, on which the radiation image has been recorded, and carrying out image processing of the image signal.

DESCRIPTION OF THE PRIOR ART

Techniques for reading out a recorded radiation image in order to obtain an image signal, carrying out appropriate image processing on the image signal, and then reproducing a visible image by use of the processed image signal have heretofore been known in various fields. For example, as disclosed in Japanese Patent Publication No. 61(1986)-5193, an X-ray image is recorded on an X-ray film having a small gamma value designed so as to match the type of image processing to be carried out, the X-ray image is read out from the X-ray film and converted into an electric signal, and the electric signal (image signal) is processed and then used for reproducing the X-ray image as a visible image on a copy photograph or the like. In this manner, a visible image having good image quality with high contrast, high sharpness, high graininess or the like can be reproduced.

Also, when certain kinds of phosphors are exposed to radiation such as X-rays, α-rays, β-rays, γ-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored during exposure to the radiation. A phosphor exhibiting such properties is referred to as a stimulable phosphor. As disclosed in U.S. Pat. Nos. 4,258,264, 4,276,473, 4,315,318 and 4,387,428 and Japanese Unexamined Patent Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object such as the human body in order to store a radiation image of the object thereon, and is then scanned with stimulating rays, such as a laser beam, which cause it to emit light in proportion to the amount of energy stored during exposure to the radiation. The light emitted by the stimulable phosphor sheet upon stimulation thereof is photoelectrically detected and converted into an electric image signal, and by using the image signal the radiation image of the object is reproduced as a visible image on a recording material such as a photographic film, a display device such as a cathode ray tube (CRT), or the like.

Radiation image recording and reproducing systems which use stimulable phosphor sheets are advantageous over conventional radiography using silver halide photographic materials in that images can be recorded even when the energy intensity of the radiation to which the stimulable phosphor sheet is exposed varies over a wide range. More specifically, since the amount of light emitted upon stimulation after the radiation energy is stored on the stimulable phosphor varies over a wide range and is proportional to the amount of energy stored during exposure to the radiation, it is possible to obtain an image having a desirable density regardless of the energy intensity of the radiation to which the stimulable phosphor sheet was exposed, by setting an appropriate read-out gain when detecting the emitted light and converting it into an electric signal to be used in reproduction of a visible image on a recording material or a display device.

In order to detect an image signal accurately, certain factors which affect the image signal must be set in accordance with the dose of radiation delivered to the stimulable phosphor sheet and the like. A novel radiation image recording and reproducing system which accurately detects an image signal has been proposed in, for example, Japanese Unexamined Patent Publication Nos. 58(1983)-67240, 58(1983)-67241 and 58(1983)-67242. The proposed radiation image recording and reproducing system is constituted such that a preliminary read-out operation (hereinafter simply referred to as "preliminary read out") is carried out for approximately ascertaining the radiation image stored on the stimulable phosphor sheet. In the preliminary read out, the stimulable phosphor sheet is scanned with a light beam having a comparatively low energy level, and a preliminary read-out image signal obtained during the preliminary read out is analyzed. Thereafter, a final read-out operation (hereinafter simply referred to as "final read out") is carried out for obtaining the image signal, which is to be used during the reproduction of a visible image. In the final read out, the stimulable phosphor sheet is scanned with a light beam having an energy level higher than the energy level of the light beam used in the preliminary read out, and the radiation image is read out with the factors affecting the image signal adjusted to appropriate values on the basis of the results of an analysis of the preliminary read-out image signal.

The term "read-out condition" as used hereinafter means a group of various factors, which are adjustable and which affect the relationship between the amount of light emitted by the stimulable phosphor sheet during image read out and the output of a read-out means. For example, the term "read out condition" may refer to a read-out gain and a scale factor which define the relationship between the input to the read-out means and the output therefrom, or the power of the stimulating rays used when the radiation image is read out.

The term "energy level of a light beam" as used herein means the level of energy of the light beam to which the stimulable phosphor sheet is exposed per unit area. In cases where the energy of the light emitted by the stimulable phosphor sheet depends on the wavelength of the irradiated light beam, i.e. the sensitivity of the stimulable phosphor sheet to the irradiated light beam depends upon the wavelength of the irradiated light beam, the term "energy level of a light beam" means the weighted energy level which is calculated by weighting the energy level of the light beam, to which the stimulable phosphor sheet is exposed per unit area, with the sensitivity of the stimulable phosphor sheet to the wavelength. In order to change the energy level of a light beam, light beams of different wavelengths may be used, the intensity of the light beam produced by a laser beam source or the like may be changed, or the intensity of the light beam may be changed by moving an ND filter or the like into and out of the optical path of the light beam. Alternatively, the diameter of the light beam may be changed in order to alter the scanning density, or the speed at which the stimulable phosphor sheet is scanned with the light beam may be changed.

Regardless of whether the preliminary read out is or is not carried out, it has also been proposed to analyze the image signal (including the preliminary readout image signal) obtained and to adjust an image processing condition, which is to be used when the image signal is processed, on the basis of the results of an analysis of the image signal. The proposed method is applicable to cases where an image signal is obtained from a radiation image recorded on a recording medium such as conventional X-ray film, as well as to the systems using stimulable phosphor sheets.

In general, an operation (hereinafter referred to as EDR) which calculates the read-out condition and/or the image processing condition on the basis of an image signal (including a preliminary read out image signal) is performed by algorithms. The algorithms are designed on the basis of results obtained from the statistical processing of a large number of radiation images. However, after operations of a radiation image read-out apparatus wherein a predetermined EDR is employed are started, it is often required to alter the EDR to a different EDR, which is performed by new algorithms, in accordance with the mode of use of the radiation image read out apparatus.

However, in general, whether the EDR performed by new algorithms is or is not suitable in all aspects for the types of radiation image recording carried out at the location of the radiation image read-out apparatus can be known only after the radiation image read-out apparatus has been operated for a long time with the EDR performed by the new algorithms. Therefore, when the EDR is changed to a new EDR, it cannot be confirmed that the new EDR performed by the new algorithms be suitable in all aspects for the radiation image read-out apparatus. Also, in cases where the new EDR is not suitable for the radiation image read-out apparatus, the image of the object must be rerecorded. In cases where the object is a human body, the radiation dose to the human body is doubled when image recording is repeated. This problem should be avoided because radiation is harmful to the human body.

Examples of cases where the aforesaid problems arise will be described hereinbelow.

One of the characteristics of a recorded image which should be considered when the algorithms are selected for an EDR is that unnecessary portions of an object may be recorded on a recording medium when scattered radiation impinges upon those portions. Also, radiation may impinge directly upon a portion of a recording medium without being passed through or reflected by an object. In this manner, an image signal picks up unnecessary components which must be removed in order to obtain an image signal representing only the desired portions of a radiation image.

FIGS. 3A, 3B and 3C are graphs showing probability density functions of preliminary read-out image signals SP detected by preliminary read-out operations carried out on three stimulable phosphor sheets.

FIG. 3A shows an example of the probability density function of a preliminary read-out image signal SP detected from a radiation image for which an EDR is suitable and which is of the type accounting for most (for example, 99.5%) radiation images.

With reference to FIG. 3A, the values of the preliminary read-out image signal SP which were obtained by detecting the light emitted by a stimulable phosphor sheet during preliminary read out and which are proportional to the amount of light emitted are plotted on the horizontal axis, which has a logarithmic scale. The relative frequency of occurrence of the values of the preliminary read-out image signal SP is plotted on the vertical axis at the upper part of the graph, and the values of the image signal obtained during the final read out are plotted on a logarithmic scale on the vertical axis at the lower part of the graph. In this case, the probability density function of the preliminary read-out image signal SP is composed of projecting portions A, B and C, and it is assumed that the projecting portion B corresponds to the part of a radiation image which it is necessary to reproduce. By way of example, in order to find the projecting portion B, the values of the probability density function are compared with a predetermined threshold value T, starting with the value of the function at the minimum value SL of the preliminary read-out image signal SP and working along the direction of increase of the image signal values, i.e. along the chained line. When the probability function crosses through the threshold value T, a calculation is made to find out whether the function is rising or falling. In this manner, a second rising point "a" and a second falling point "b" are found. The maximum and minimum values of the preliminary read-out image signal SP at the points "b" and "a" are denoted by Smax and Smin, respectively. The read-out condition for the final read out is set so that, during the final read out, the image information represented by the emitted light signal for values of the emitted light falling within the range of Smax to Smin is reproduced accurately. Specifically, the read-out condition for the final read out is set so that Smax and Smin of the preliminary read-out image signal SP are detected respectively as the maximum image signal value Qmax and the minimum image signal value Qmin in the final read out. The maximum image signal value Qmax and the minimum image signal value Qmin in turn correspond respectively to the maximum density Dmax and the minimum density Dmin within the predetermined correct density range of the visible image ultimately reproduced. More specifically, the read-out condition for the final read out is set so that, during the final read out, the image information represented by values of the emitted light signal falling within the range of Smax to Smin is detected as an image signal with values lying on the straight line G shown in FIG. 3A.

In the manner described above, for most of the radiation images, the read-out condition for the final read out can be adjusted appropriately. However, in some cases, the correct read-out condition cannot be determined with this method. One such case will be described hereinbelow.

FIG. 3B shows the probability density function of a preliminary read-out image signal SP' detected from a radiation image of an object approximate to the object, the radiation image of which yielded the probability density function shown in FIG. 3A. In the case of both FIGS. 3A and 3B, the radiation images of the objects (by way of example, the chest of a human body) were recorded under the same image recording conditions, i.e. the characteristics of the recorded images were the same.

When the probability density function shown in FIG. 3B is compared with that shown in FIG. 3A, projecting portions B' and C' approximate the projecting portions B and C, respectively. However, a projecting portion A' differs from the projecting portion A, in that it is divided into two projecting portions, A1' and A2'. Such a difference in the probability density function is caused by variation in the object, the characteristics of the recorded radiation image, or the like, and inevitably arises with a predetermined probability. The probability with which such a difference arises differs markedly between facilities, for example, hospitals, wherein radiation image recording and reproducing systems are provided.

When the method described above is applied to the probability density function shown in FIG. 3B, the values of the probability density function are compared with the predetermined threshold value T. Starting from the value of the function corresponding to the minimum value SL' of the preliminary read-out image signal SP', whenever the value of the function crosses over the threshold value T, a calculation is made as to whether the function is rising or falling. In this manner, a second rising point a' and a second falling point b' are found. However, the range of the preliminary read-out image signal SP between the points a' and b' is different and far apart from the range (of the projecting portion B') corresponding to the parts of the radiation image, which it is necessary to reproduce. If the final read out is carried out so that, during the final read out, the image information represented by an emitted light signal with values falling within the range between the points a' and b' is detected as an image signal with values lying on a straight line G', the image signal thus obtained will not contain the necessary image information, and cannot yield a useful visible image. In such cases, the recording of the radiation image of the object must be repeated.

In order to eliminate the problems described above, a new EDR performed by new algorithms may be employed, so that the values of the probability density function shown in FIG. 3A are compared with a predetermined threshold value T, starting with the value of the function at the maximum value SH of the preliminary read out image signal SP and working along the direction of decrease of the image signal values. In this manner, a second rising point "b" and a second falling point "a" may be found.

However, with this method, in cases where a projection portion C" is divided into projecting portions C1" and C2" as shown in FIG. 3C, the projecting portion C1" will be found incorrectly as the range of the preliminary read-out image signal SP corresponding to the parts of the radiation image, which it is necessary to reproduce. In such a case, the probability with which the incorrect detection of the necessary image information arises will increase to, for example, 2% because of employment of the new EDR when the probability was 0.5% with the previous EDR. Moreover, as described above, the probability differs markedly between facilities wherein radiation image recording and reproducing systems are provided. Therefore, whether incorrect detection of the necessary image information increases or decreases with the new EDR can be known only after the radiation image recording and reproducing system has been operated with the new EDR for a long time.

SUMMARY OF THE INVENTION

The primary object of the present invention is to provide a radiation image read out apparatus wherein an EDR employed in the radiation image read-out apparatus which is in operation is changed to a new EDR performed by new algorithms after it is confirmed that the new EDR does not increase incorrect detection of necessary image information.

Another object of the present invention is to provide a radiation image read-out apparatus which is made suitable for characteristics of the facility, wherein the radiation image read-out apparatus is provided, through sequential renewal of an EDR.

FIG. 1A is a block diagram showing the general configuration of the first radiation image read-out apparatus in accordance with the present invention wherein a preliminary read-out image signal obtained by preliminary read out is utilized.

With reference to FIG. 1A, the first radiation image read-out apparatus in accordance with the present invention comprises:

(i) a preliminary read-out means 1 for scanning a stimulable phosphor sheet, on which a radiation image has been stored, with a light beam in order to release part of the energy stored during exposure to radiation as light emitted from said stimulable phosphor sheet, detecting the light emitted by said stimulable phosphor sheet, and obtaining a preliminary read-out image signal which approximately represents said radiation image, (ii) a final read-out means 2 for scanning said stimulable phosphor sheet with a light beam having an energy level higher than that of said light beam used in said preliminary read-out means 1, detecting light emitted by said stimulable phosphor sheet when it is thus scanned, and obtaining a final read-out image signal which represents said radiation image, (iii) an image processing means 3 for receiving said final read-out image signal and carrying out image processing of said final read-out image signal, and iv) a condition adjusting means 4 for receiving said preliminary read out image signal, adjusting a read-out condition to be used in detection of said final read-out image signal and/or an image processing condition to be used in image processing, said adjustment being effected on the basis of information carried by said preliminary read-out image signal, and feeding said read-out condition into said final read-out means 2 and/or feeding said image processing condition into said image processing means 3.

Said condition adjusting means 4 is constituted of:

(a) a storage section 4a for storing said preliminary read-out image signal, (b) a first operating section 4b for reading said preliminary read-out image signal from said storage section 4a, carrying out a first operating process based on said preliminary read-out image signal in order to calculate a first read-out condition to be used in detection of a final read-out image signal and/or a first image processing condition to be used in image processing of a final read-out image signal, (c) a second operating section 4c for reading said preliminary read-out image signal from said storage section 4a, carrying out a second operating process which is different from said first operating process, based on said preliminary read-out image signal in order to calculate a second read-out condition to be used in detection of a final read out image signal and/or a second image processing condition to be used in image processing of a final read-out image signal, (d) a displaying section 4d for receiving and displaying both said first read-out condition and/or said first image processing condition on one hand and said second read-out condition and/or said second image processing condition on the other hand, and (e) a change-over section 4e for receiving said first read-out condition and/or said first image processing condition, and said second read-out condition and/or said second image processing condition, and selectively activating either one of a mode wherein said first read-out condition is fed into said final read-out means 2 and/or said first image processing condition is fed into said image processing means 3, and a mode wherein said second read-out condition is fed into said final read-out means 2 and/or said second image processing condition is fed into said image processing means 3.

The radiation image read-out apparatus in accordance with the present invention is also applicable to cases wherein no preliminary read-out operations are carried out. However, in such cases, the image processing condition is calculated, while the read-out condition is not calculated.

FIG. 1B is a block diagram showing a general configuration of the second radiation image read-out apparatus in accordance with the present invention, wherein no preliminary read-out operations are carried out.

With reference to FIG. 1B, the second radiation image read-out apparatus in accordance with the present invention comprises:

(i) a read-out means 2' for obtaining an image signal by reading out a radiation image from a recording medium, such as a stimulable phosphor sheet or photographic film, on which the radiation image has been recorded, (ii) an image processing means 3' for receiving said image signal and carrying out image processing of said image signal, and (iii) a condition adjusting means 4' for receiving said image signal, adjusting an image processing condition to be used in image processing, said adjustment being effected on the basis of said image signal, and feeding said image processing condition into said image processing means 3', wherein said condition adjusting means 4' is constituted of:

(a) a storage section 4a' for storing said image signal, (b) a first operating section 4b' for reading said image signal from said storage section 4a', and carrying out a first operating process based on said image signal in order to calculate a first image processing condition to be used in image processing, (c) a second operating section 4c' for reading said image signal from said storage section 4a', and carrying out a second operating process, which is different from said first operating process, based on said image signal in order to calculate a second image processing condition to be used in image processing, (d) a displaying section 4d' for receiving and displaying both said first image processing condition and said second image processing condition, and (e) a change-over section 4e' for receiving said first image processing condition and said second image processing condition, and selectively activating either one of a mode wherein said first image processing condition is fed into said image processing means 3', and a mode wherein said second image processing condition is fed into said image processing means 3'.

In preferred embodiments of the radiation image read-out apparatuses in accordance with the present invention, light which is obtained from the recording medium and which represents the radiation image recorded on the recording medium is photoelectrically detected and converted into an image signal. The term "light obtained from a recording medium and representing a radiation image" as used herein embraces light emitted by a stimulable phosphor sheet when it is exposed to stimulating rays, and light which has passed through a photographic film or is reflected therefrom.

With the first and second radiation image read-out apparatuses in accordance with the present invention, the condition adjusting means 4 or 4' has two operating sections. Operations based on an EDR which is being used currently may be carried out in the first operating section 4b or 4b', and the results of the operations carried out in the first operating section 4b or 4b' may be output through the change-over section 4e or 4e' to the final read out means 2 and/or the image processing means 3, or to the image processing means 3'. Therefore, the first and second radiation image read-out apparatuses in accordance with the present invention can be operated in the same manner as the conventional radiation image read-out apparatus.

When a new EDR is employed, operations based on the new EDR are carried out in the second operating section 4c or 4c', while operations based on the previous EDR are being carried out in the first operating section 4b or 4b'. The results of operations carried out in the first operating section 4b or 4b' and the results of operations carried out in the second operating section 4c or 4c' are displayed on the displaying section 4d or 4d' and compared with each other. At this time, the change-over section 4e or 4e' is set so that the results of operations carried out in the first operating section 4b or 4b' are output to the final read-out means 2 and/or the image processing means 3, or to the image processing means 3'. When the radiation image read-out apparatus is operated for some time in this manner, the reliability of the operations carried out in the second operating section 4c or 4c' based on the new EDR can be investigated while the apparatus is being operated with the previous EDR.

After it is confirmed that the new EDR is substantially reliable, the change-over section 4e or 4e' is set so that the results of operations carried out in the second operating section 4c or 4c' are output to the final read-out means 2 and/or the image processing means 3, or to the image processing means 3'. Thereafter, the read-out condition calculated with the new EDR is used in the final read out, and/or the image processing condition calculated with the new EDR is used in image processing.

As described above, with the first and second radiation image read-out apparatuses in accordance with the present invention, an EDR used currently can be changed to a new EDR performed by new algorithms after it is confirmed that the new EDR does not increase incorrect detection of necessary image information. Accordingly, the EDR which was determined when the radiation image read-out apparatus was manufactured can be renewed sequentially to an EDR suitable for characteristics of the facility, wherein the radiation image read-out apparatus is provided, so that the radiation image read-out apparatus can be made more suitable for the facility.

The condition adjusting means 4 or 4' may be constituted so that the second operating section 4c or 4c' and the displaying section 4d or 4d' can be provided when the EDR is renewed. Also, after the EDR has been renewed, the first operating section 4b or 4b' and the displaying section 4d or 4d' may be removed from the radiation image read-out apparatus.

BRIEF DESCRIPTION OF THE DRAWINGS

FIG. 1A is a block diagram showing the general configuration of the first radiation image read-out apparatus in accordance with the present invention, FIG. 1B is a block diagram showing the general configuration of the second radiation image read-out apparatus in accordance with the present invention.

DESCRIPTION OF THE PREFERRED EMBODIMENTS

The present invention will hereinbelow be described in further detail with reference to the accompanying drawings.

Figure 2:
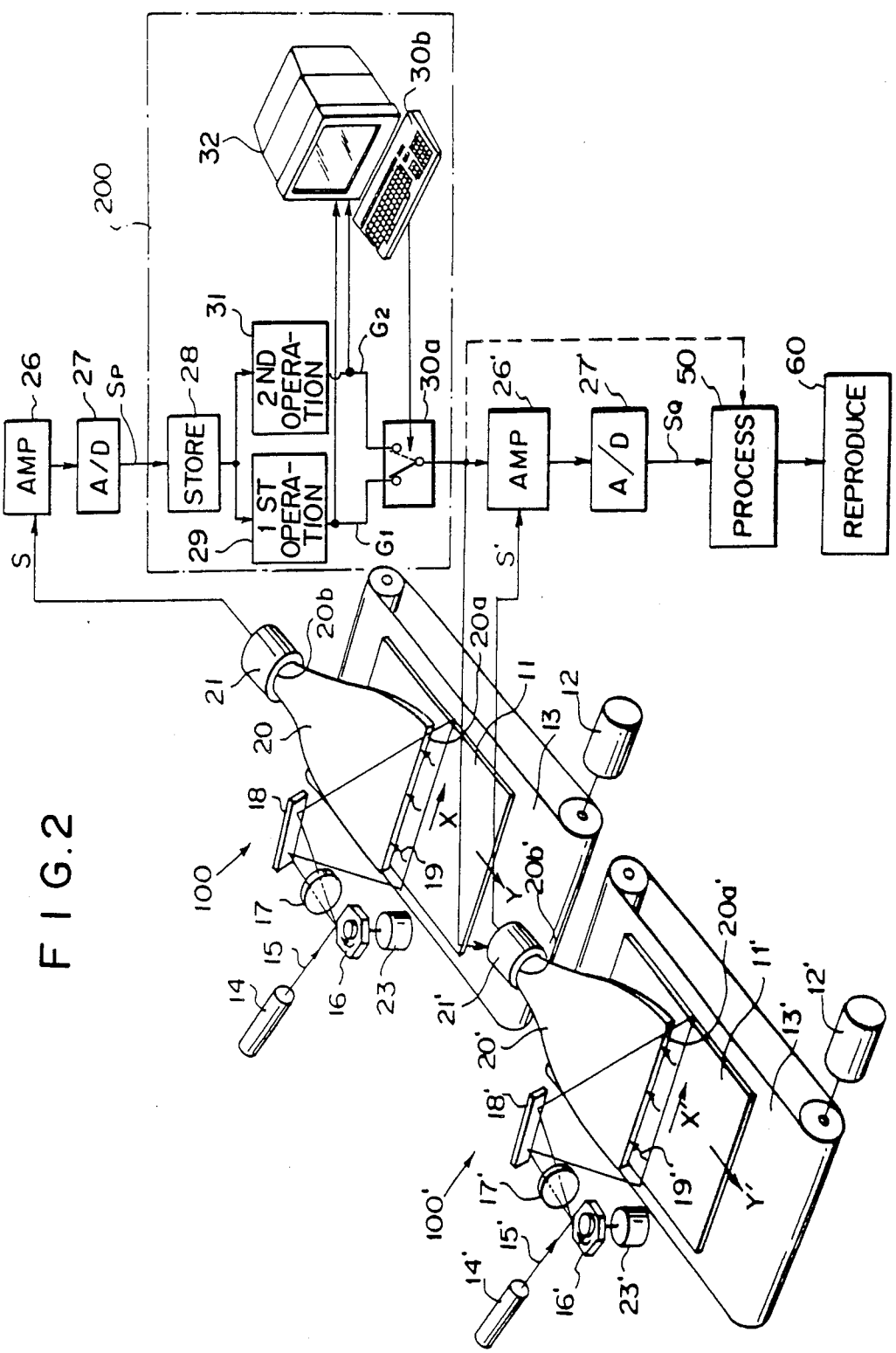
FIGS. 2 is a perspective view showing an embodiment of the first radiation image read-out apparatus in accordance with the present invention.
Figure 3A:
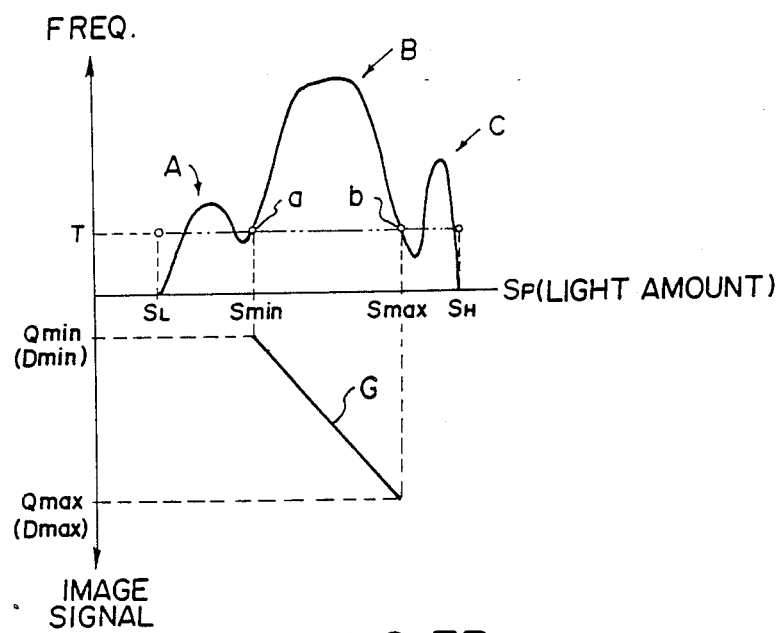
FIGS. 3A, 3B and 3C are graphs showing probability density functions of preliminary read-out image signals.
Figure 3B:
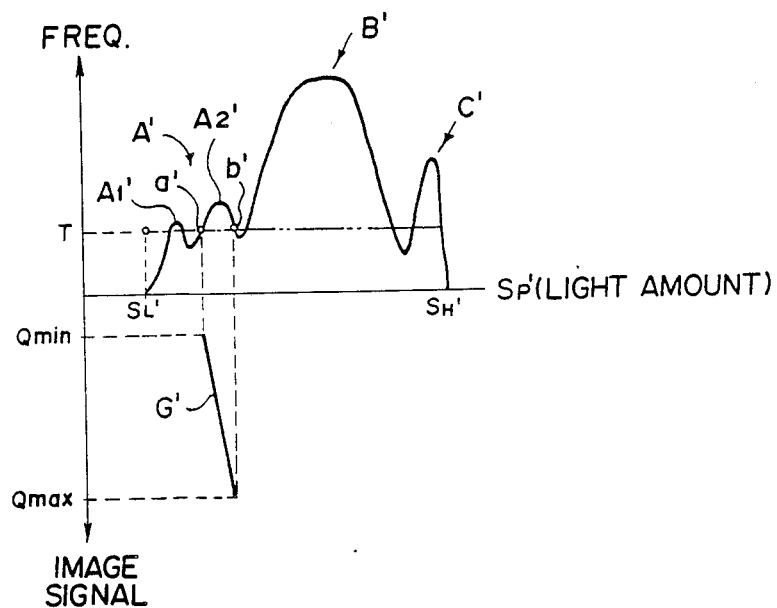
Figure 3C:
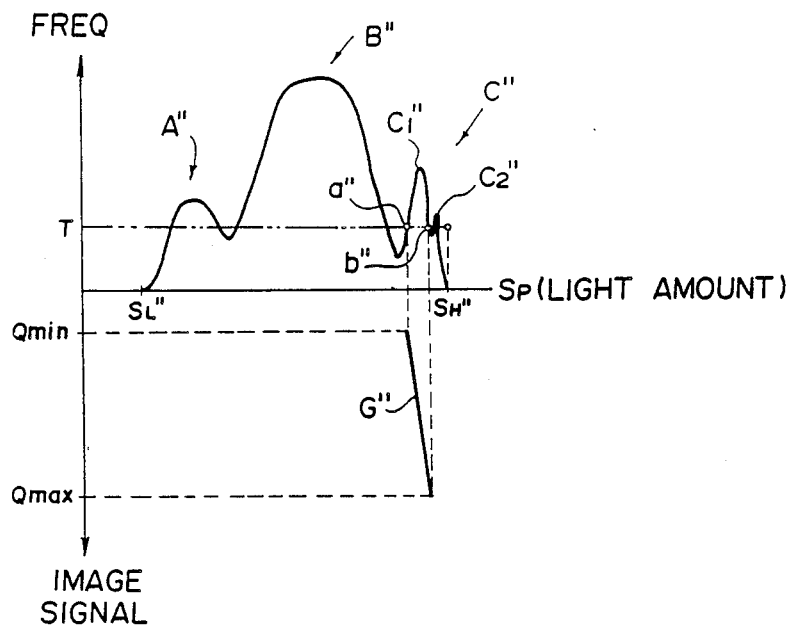

With reference to FIG. 2, an embodiment of the first radiation image read-out apparatus in accordance with the present invention utilizes a stimulable phosphor sheet and carries out preliminary read out.

A stimulable phosphor sheet 11 on which a radiation image has been stored is placed at a predetermined position in a preliminary read-out means 100 which carries out preliminary read out by scanning the stimulable phosphor sheet 11 with a light beam having a low energy level, thereby releasing only part of the energy stored during exposure to radiation from the stimulable phosphor sheet 11. The stimulable phosphor sheet 11 is conveyed in a sub-scanning direction indicated by the arrow Y by a sheet conveyance means 13 which is constituted of an endless belt or the like and which is operated by a motor 12. On the other hand, a laser beam 15 having a low energy level produced by a laser beam source 14 is reflected and deflected by a rotating polygon mirror 16 which is being quickly rotated by a motor 23 in the direction indicated by the arrow, and caused to pass through a converging lens 17 constituted of a fθ lens or the like. The direction of the optical path of the laser beam 15 is then changed by a mirror 18, and the laser beam 15 is caused to impinge upon the stimulable phosphor sheet 11 and scan it is a main scanning direction indicated by the arrow X, which direction is approximately normal to the sub-scanning direction indicated by the arrow Y. When the stimulable phosphor sheet 11 is exposed to the laser beam 15, the exposed portion of the stimulable phosphor sheet 11 emits light 19 in an amount proportional to the amount of energy stored thereon during exposure to radiation. The emitted light 19 is guided by a light guide member 20, and photoelectrically detected by a photomultiplier 21 which acts as a photodetector. The light guide member 20 is made by the forming of a light guiding material such as an acrylic plate, and has a linear light input face 20a positioned to extend along the main scanning line on the stimulable phosphor sheet 11, and a ring-shaped light output face 20b positioned so that it is in close contact with a light receiving face of the photomultiplier 21. The emitted light 19 which has entered the light guide member 20 from its light input face 20a is guided through repeated total reflection inside of the light guide member 20, emanates from the light output face 20b, and is received by the photomultiplier 21. In this manner, the amount of the emitted light 19 carrying the radiation image is converted into an electric signal by the photomultiplier 21.

An analog output signal S generated by the photomultiplier 21 is amplified by an amplifier 26, and digitized by an A/D converter 27 into a preliminary read-out image signal SP.

In the preliminary read out, a read-out condition such as the voltage applied to the photomultiplier 21 or the amplification factor of the amplifier 26 is adjusted so that image information can be detected for a wide range in the amount of energy stored on the stimulable phosphor sheet 11 during exposure to radiation.

The preliminary read-out image signal SP obtained in the manner described above is fed into storage section 28 in a condition adjusting means 200 and stored therein. Thereafter, the preliminary read-out image signal SP is read from the storage section 28, and fed into a first operating section 29. The first operating section 29 calculates the read-out condition G1 for the final read out, such as the voltage applied to a photomultiplier 21' or the amplification factor of an amplifier 26', on the basis of the preliminary read-out image signal SP. The read-out condition thus calculated is fed into a final read-out means 100' via a switch 30a.

A stimulable phosphor sheet 11' on which the preliminary read out has been finished is placed at a predetermined position in the final read-out means 100', and scanned with a light beam 15' having an energy level higher than that of the light beam 15 used in the preliminary read-out. In this manner, an image signal SQ is detected on the basis of the read-out condition G1 adjusted as described above. The configuration of the final read-out means 100' is nearly the same as that of the preliminary read-out means 100, and therefore elements corresponding to those constituting the preliminary read-out means 100 are numbered with corresponding primed reference numerals in FIG. 2

After the image signal SQ is digitized in an A/D converter 27', the image signal SQ is fed into an image processing means 50, which carries out appropriate image processing of the image signal SQ. After being image processed, the image signal is fed into a reproducing apparatus 60, which reproduces a visible image by use of the image signal.

In cases where the read-out condition is determined on the basis of a new EDR which is performed by new algorithms, a second operating section 31 is operated simultaneously with the first operating section 29. The second operating section 31 calculates the read-out condition G2 on the basis of the new algorithms, while the first operating section 29 is calculating the read-out condition G1 based on the previous algorithms. Both the read-out conditions G1 and G2 are displayed on a CRT display device 32 which acts as the displaying section. The reliability of the read-out condition G2 based on the new algorithms is evaluated by an operator who views the information displayed on the CRT display device 32. When the read-out condition G2 based on the new algorithms has been evaluated to be substantially reliable, a keyboard 30b is operated in order to change over the switch 30a to the position indicated by the broken line. After the switch 30a is thus changed over, the final read out is carried out under the read-out condition G2 based on the new algorithms. The change-over sections 4e and 4e' shown in FIGS. 1A and 1B are each constituted of the switch 30a and the keys of the keyboard 30b, which keys change over the setting of the switch 30a. After the switch 30a is changed over to the position indicated by the broken line, the operation of the first operating section 29 is stopped.

In the embodiment described above, the preliminary read-out means 100 and the final read-out means 100' are separate from each other. Alternatively, because the configurations of the preliminary read-out means 100 and the final read-out means 100' are approximately identical to each other, a single read-out means may be utilized for performing both the preliminary read out and the final read out. In this case, after the preliminary read out is carried out by the scanning of the stimulable phosphor sheet 11 with a light beam having a low energy level, the stimulable phosphor sheet 11 may be moved back to the position at which the image read-out is started. Thereafter, the final read out may be carried out by scanning the stimulable phosphor sheet 11 with a light beam having a high energy level.

In cases where a single read-out means is utilized to perform both the preliminary read out and the final read out, it is necessary to change the intensity of the light beam used in the preliminary read out and the final read out. For this purpose, various methods may be employed as described above, for example, a laser beam source or the like may change the intensity of the light beam.

In the aforesaid embodiment, the read-out condition for the final read out is adjusted by the condition adjusting means 200. Alternatively, the final read out may be carried out by using a predetermined read-out condition regardless of the characteristics of the preliminary read-out image signal SP. On the basis of the preliminary read-out image signal SP, the condition adjusting means 200 may adjust an image processing condition to be used in the image processing means 50 which carries out image processing of the image signal SQ. The image processing condition calculated by the condition adjusting means 200 may then be fed into the image processing means 50 as indicated by the broken line in FIG. 2. The condition adjusting means 200 may also adjust both the read-out condition and the image processing condition.

The present invention is also applicable to radiation image read-out apparatuses wherein no preliminary read-out operations are carried out, and only the aforesaid final read-out operations are carried out. In these cases, an image signal is obtained by use of a predetermined read-out condition. Based on the image signal, an image processing condition is calculated by a condition adjusting means. The calculated image processing condition is taken into consideration when the image signal is processed.

The present invention is not limited to the aforesaid embodiment wherein a stimulable phosphor sheet is used, and is also applicable to, for example, an X-ray image read out apparatus wherein conventional X-ray film is used.

Figure 4:
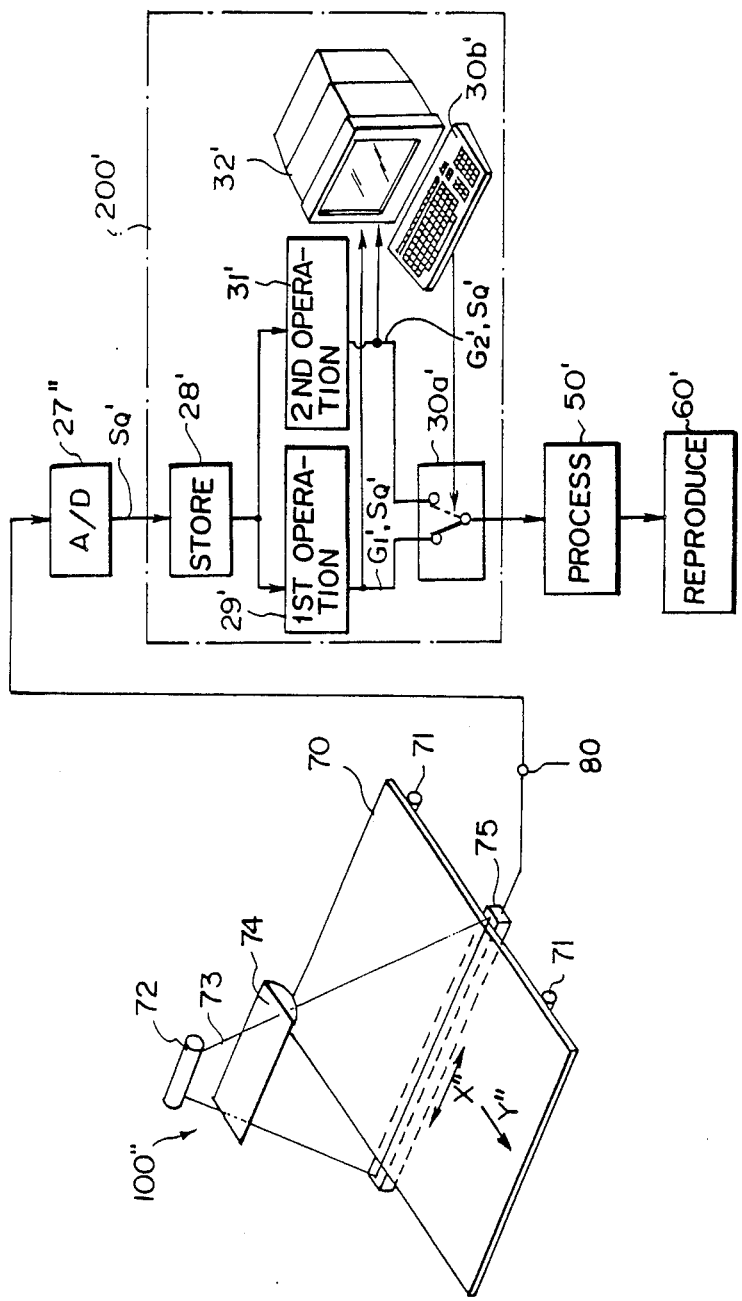
FIG. 4 is a perspective view showing an embodiment of the X-ray image read-out apparatus in accordance with the present invention, wherein an X-ray image recorded on an X-ray film is read out.

With reference to FIG. 4, a sheet of X-ray film 70 on which an X-ray image has been recorded in placed at a predetermined position in a read-out means 100", and is conveyed in the direction indicated by the arrow Y" by a film conveyance means 71.

Reading light 73 produced by an elongated light source 72 extending in one direction is converged by a cylindrical lens 74, and is linearly irradiated onto the X-ray film 70 along the directions indicated by the arrow X", which are approximately normal to the direction indicated by the arrow Y". A MOS sensor 75 is positioned below the X-ray film 70 so that the MOS sensor 75 can receive the reading light 73 which has passed through the X-ray film 70, the intensity of which light has been modulated in accordance with the X-ray image recorded on the X-ray film 70. The MOS sensor 75 comprises a plurality of solid state photoelectric conversion devices which are arrayed linearly at intervals equal to the intervals between the picture elements of the X-ray image along directions indicated by the arrow X". As long as the X-ray film 70 is conveyed in the direction indicated by the arrow Y" while being exposed to the reading light 73, the MOS sensor 75 detects the reading light, which has passed through the X-ray film 70, at predetermined intervals corresponding to the intervals between the picture elements of the X-ray image along the direction indicated by the arrow Y".

Figure 5:
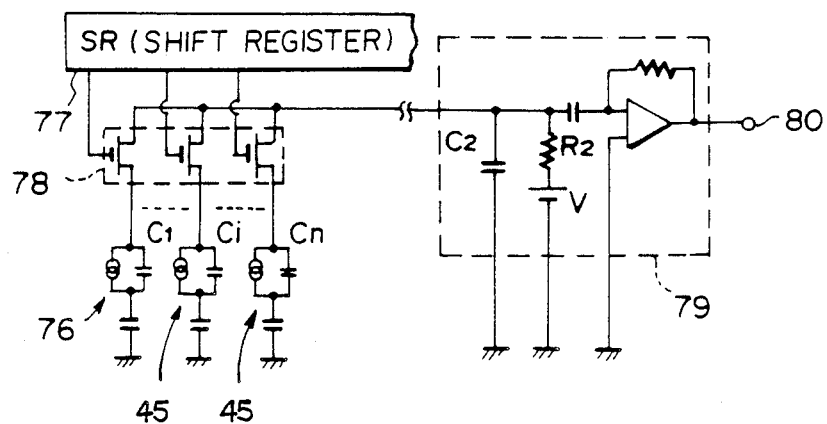
FIG. 5 is a circuit diagram showing an equivalent circuit for a MOS sensor.

FIG. 5 shows an equivalent circuit for the MOS sensor 75.

With reference to FIG. 5, photocarriers generated when the reading light 73 impinges upon the solid state photoelectric conversion devices 76, 76, . . . accumulate in capacitors Ci (i=1, 2, . . . , n) of the solid state photoelectric conversion devices 76, 76, . . . The number of photocarriers which accumulate in the capacitors Ci is detected by sequentially turning on and off the switches of a switch section 78. A shift register 77 controls the switches of the switch section 78, and a time-serial image signal is obtained. The image signal is then amplified by a pre-amplifier 79 and is output at an output terminal 80 of the pre-amplifier 79.

The analog image signal output by the MOS sensor 75 is sampled and digitized into an image signal SQ' by an A/D converter 27" shown in FIG. 4.

The image signal SQ' obtained in the manner described above is fed into a storage section 28' in a condition adjusting means 200' and stored therein. Thereafter, the image signal SQ' is read from the storage section 28', and fed into a first operating section 29'. The first operating section 29' calculates the image processing condition G1', which is to be used in image processing, on the basis of the image signal SQ'. The image processing condition G1' thus calculated is fed together with the image signal SQ' into an image processing means 50' via a switch 30a'.

The image processing means 50', which carries out appropriate image processing of the image signal SQ'. After being image processed, the image signal is fed into a reproducing apparatus 60', which reproduces a visable image by use of the image signal.

In cases where the image processing condition is determined on the basis of a new EDR which are performed by new algorithms, a second operating section 31' is operated simultaneously with the first operating section 29'. The second operating section 31' calculates the image processing condition G2' on the basis of the new algorithms, while the first operating section 29' is calculating the image processing condition G1' based on the previous algorithms. Both the image processing conditions G1' and G2' are displayed on a CRT display device 32' which acts as the displaying section. The reliability of the image processing condition G2' based on the new algorithms is evaluated by an operator who views the information displayed on the CRT display device 32'. When the image processing condition G2' based on the new algorithms has been evaluated to be substantially reliable, a keyboard 30b' is operated in order to change over the switch 30a' to the position indicated by the broken line. After the switch 30a' is thus changed over, image processing is carried out under the image processing condition G2' based on the new algorithms. The change-over section 4e' shown in FIG. 1B is constituted of the switch 30a' and the keys of the keyboard 30b', which keys change over the setting of the switch 30a'. After the switch 30a' is changed over to the position indicated by the broken line, the operation of the first operating section 29' is stopped.

In the embodiment shown in FIG. 4, the MOS sensor 75 may be replaced by a charge coupled device (CCD) or a charge priming device (CPD). Also, the X-ray image may be read out from the X-ray film 70 by two-dimensionally scanning the X-ray film 70 with a light beam in the same manner as that described above for image read-out from the stimulable phosphor sheet. Furthermore, instead of detecting light which has passed through the X-ray film 70, light reflected by the X-ray film 70 may be detected.

The present invention is applicable to various types of radiation image read-out apparatuses wherein an image signal is obtained by reading out a radiation image from a recording medium, on which the radiation image has been recorded, and wherein the image signal is processed in accordance with an image processing condition.

I claim:

1. A radiation image read-out apparatus comprising:
   (i) a preliminary read-out means for scanning a stimulable phosphor sheet, on which a radiation image has been stored, with a light beam in order to release part of the energy stored during exposure to radiation as light emitted from said stimulable phosphor sheet, detecting the light emitted by said stimulable phosphor sheet, and obtaining a preliminary read-out image signal which approximately represents said radiation image,
   (ii) a final read-out means for scanning said stimulable phosphor sheet with a light beam having an energy level higher than that of said light beam used in said preliminary read-out means, detecting light emitted by said stimulable phosphor sheet when it is thus scanned, and obtaining a final read-out image signal which represents said radiation image,
   (iii) an image processing means for receiving said final read-out image signal and carrying out image processing of said final read-out image signal, and
   (iv) a condition adjusting means for receiving said preliminary read-out image signal, adjusting a read-out condition to be used in detection of said final read-out image signal and/or an image processing condition to be used in image processing, said adjustment being effected on the basis of information carried by said preliminary read-out image signal, and feeding said read-out condition into said final read-out means and/or feeding said image processing condition into said image processing means,
   wherein said condition adjusting means is constituted of:
   (a) a storage section for storing said preliminary read-out image signal,
   (b) a first operating section for reading said preliminary read-out image signal from said storage section, carrying out a first operating process based on said preliminary read-out image signal in order to calculate a first read-out condition to be used in detection of a final read-out image signal and/or a first image processing condition to be used in image processing of a final read-out image signal,
   (c) a second operating section for reading said preliminary read-out image signal from said storage section, carrying out a second operating process, which is different from said first operating process, based on said preliminary read-out image signal in order to calculate a second read-out condition to be used in detection of a final read-out image signal and/or a second image processing condition to be used in image processing of a final read out image signal,
   (d) a displaying section for receiving and displaying both said first read-out condition and/or said first image processing condition and said second read-out condition and/or said second image processing condition, and
   (e) a change-over section for receiving said first read-out condition and/or said first image processing condition, and said second read-out condition and/or said second image processing condition, and selectively activating either one of a mode wherein said first read-out condition is fed into said final read-out means and/or said first image processing condition is fed into said image processing means, and a mode wherein said second read-out condition is fed into said final read-out means and/or said second image processing condition is fed into said image processing means.

2. An apparatus as defined in claim 1 wherein said light beam is a laser beam.

3. A radiation image read-out apparatus comprising:
   (i) a read-out means for obtaining an image signal by reading out a radiation image from a recording medium, on which the radiation image has been recorded,
   (ii) an image processing means for receiving said image signal and carrying out image processing of said image signal, and
   (iii) a condition adjusting means for receiving said image signal, adjusting an image processing condition to be used in image processing, said adjustment being effected on the basis of said image signal, and feeding said image processing condition into said image processing means,
   wherein said condition adjusting means is constituted of:
   (a) a storage section for storing said image signal,
   (b) a first operating section for reading said image signal from said storage section, and carrying out a first operating process based on said image signal in order to calculate a first image processing condition to be used in image processing,
   (c) a second operating section for reading said image signal from said storage section, and carrying out a second operating process, which is different from said first operating process, based on said image signal in order to calculate a second image processing condition to be used in image processing, (d) a displaying section for receiving and displaying both said first image processing condition and said second image processing condition, and (e) a change over section for receiving said first image processing condition and said second image processing condition, and selectively activating either one of a mode wherein said first image processing condition is fed into said image processing means, and a mode wherein said second image processing condition is fed into said image processing means.

4. An apparatus as defined in claim 3 wherein said recording medium is a stimulable phosphor sheet on which a radiation image has been stored, and said readout means obtains said image signal by scanning said stimulable phosphor sheet with a light beam in order to release the energy stored during exposure to radiation as light emitted from said stimulable phosphor sheet, and detecting the light emitted by said stimulable phosphor sheet.

5. An apparatus as defined in claim 4 wherein said light beam is a laser beam.

* * * * *